(12) United States Patent
Quillen et al.

(10) Patent No.: US 7,189,777 B2
(45) Date of Patent: Mar. 13, 2007

(54) COMPOSITIONS AND METHOD FOR IMPROVING REHEAT RATE OF PET USING ACTIVATED CARBON

(75) Inventors: Donna Rice Quillen, Kingsport, TN (US); Earl Edmondson Howell, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 83 days.

(21) Appl. No.: 10/457,657

(22) Filed: Jun. 9, 2003

(65) Prior Publication Data

US 2004/0249113 A1 Dec. 9, 2004

(51) Int. Cl.
*C08J 3/00* (2006.01)
*C08K 3/04* (2006.01)
*C08L 67/00* (2006.01)
*B60C 1/00* (2006.01)
*B29D 22/00* (2006.01)

(52) U.S. Cl. .................. 524/495; 428/35.7; 428/36.92; 428/34.1; 428/36.9; 524/496; 524/599; 524/601

(58) Field of Classification Search ............... 428/35.7, 428/36.92, 34.1, 36.9; 524/495, 496, 599, 524/601
See application file for complete search history.

(56) References Cited

U.S. PATENT DOCUMENTS

| | | | |
|---|---|---|---|
| 3,420,913 A * | 1/1969 | Railsback | .................. 524/496 |
| 4,228,549 A | 10/1980 | Rispoli | |
| 4,250,078 A | 2/1981 | McFarlane et al. | |
| 4,408,004 A | 10/1983 | Pengilly | |
| 4,420,581 A | 12/1983 | McFarlane et al. | |
| 4,476,272 A | 10/1984 | Pengilly | |
| 4,477,608 A | 10/1984 | Babler et al. | |
| 4,481,314 A | 11/1984 | Rule | |
| 4,535,118 A | 8/1985 | Pengilly | |
| 4,603,473 A | 8/1986 | Suemitsu et al. | |
| 4,617,374 A | 10/1986 | Pruett et al. | |
| 4,729,795 A * | 3/1988 | Fillipo | .................. 106/197.01 |
| 4,767,810 A | 8/1988 | Nelson | |
| 4,818,581 A | 4/1989 | Katoh et al. | |
| 4,873,279 A | 10/1989 | Nelson | |
| 4,879,335 A | 11/1989 | Hirota et al. | |
| 4,959,406 A | 9/1990 | Foltin et al. | |
| 5,041,476 A | 8/1991 | Wilder | |
| 5,053,440 A | 10/1991 | Schueler et al. | |
| 5,143,649 A | 9/1992 | Blackledge et al. | |
| 5,174,924 A | 12/1992 | Yamada et al. | |
| 5,262,470 A | 11/1993 | Shimotsuma et al. | |
| 5,308,892 A | 5/1994 | Zickler et al. | |
| 5,373,039 A | 12/1994 | Sakai et al. | |
| 5,382,157 A | 1/1995 | Denis et al. | |
| 5,409,983 A | 4/1995 | Jones et al. | |
| 5,419,936 A | 5/1995 | Tindale | |
| 5,484,837 A | 1/1996 | Kung et al. | |
| 5,484,838 A | 1/1996 | Helms et al. | |
| 5,496,880 A | 3/1996 | Heuseveldt et al. | |
| 5,529,744 A | 6/1996 | Tindale | |
| 5,576,377 A | 11/1996 | El Sayed et al. | |
| 5,599,869 A | 2/1997 | Kurz | |
| 5,643,991 A | 7/1997 | Stipe et al. | |
| 5,656,221 A | 8/1997 | Schumann et al. | |
| 5,656,716 A | 8/1997 | Schmidt et al. | |
| 5,705,555 A | 1/1998 | Guilfoy et al. | |
| 5,810,914 A | 9/1998 | Okisaki et al. | |
| 5,824,731 A | 10/1998 | Rondy et al. | |
| 5,847,039 A * | 12/1998 | Nagashima et al. | ........ 524/432 |
| 5,877,251 A | 3/1999 | Sant | |
| 5,925,710 A | 7/1999 | Wu et al. | |
| 5,939,516 A | 8/1999 | Greaves et al. | |
| 5,973,059 A | 10/1999 | Yamazaki et al. | |
| 6,017,972 A | 1/2000 | Harris et al. | |
| 6,022,920 A | 2/2000 | Maxwell et al. | |
| 6,025,429 A | 2/2000 | Yamazaki et al. | |
| 6,031,128 A | 2/2000 | Roh et al. | |
| 6,034,167 A | 3/2000 | Tung et al. | |
| 6,096,818 A | 8/2000 | Nakaura et al. | |
| 6,127,475 A | 10/2000 | Vollenberg et al. | |
| 6,153,674 A | 11/2000 | Landin | |
| 6,197,851 B1 | 3/2001 | Maxwell et al. | |

(Continued)

FOREIGN PATENT DOCUMENTS

DE          4235302          4/1994

(Continued)

OTHER PUBLICATIONS

Research Disclosure; May 1997; RD 39771.

(Continued)

*Primary Examiner*—Patrick D. Niland
(74) *Attorney, Agent, or Firm*—Bernard J. Graves, Jr.; Dennis V. Carmen

(57) ABSTRACT

A polyester composition, a preform, and a bottle, containing a polyester such as polyethylene terephthalate or polyethylene naphthalate and activated carbon to enhance the rate for reheating the composition is provided. Activated carbon may be added in the presence of active phosphorus containing compounds, or at any stage in the melt phase after prepolymerization and after the polyester polymer is solidified. Polyester concentrates containing activated carbon may be added to bulk polyesters to make preforms suitable for blowing into bottles.

91 Claims, 4 Drawing Sheets

U.S. PATENT DOCUMENTS

| | | |
|---|---|---|
| 6,200,659 B1 | 3/2001 | Fujimori et al. |
| 6,221,282 B1 | 4/2001 | Van Konynenburg |
| 6,261,656 B1 | 7/2001 | Semersky |
| 6,358,578 B1 | 3/2002 | Otto et al. |
| 6,376,577 B2 | 4/2002 | Kniess et al. |
| 6,403,697 B1 | 6/2002 | Mitsunaga et al. |
| 6,469,092 B1 | 10/2002 | Stoppelmann et al. |
| 6,503,586 B1 | 1/2003 | Wu et al. |
| 6,660,792 B2 | 12/2003 | Massey et al. |
| 2002/0011694 A1 | 1/2002 | Nichols et al. |
| 2002/0077443 A1 | 6/2002 | Nichols et al. |

FOREIGN PATENT DOCUMENTS

| | | |
|---|---|---|
| DE | 19820123 | 11/1999 |
| DE | 198 54 238 | 5/2000 |
| EP | 0191240 | 8/1986 |
| EP | 322737 | 7/1989 |
| EP | 0465040 A1 | 1/1992 |
| EP | 0485181 | 5/1992 |
| EP | 0495668 | 7/1992 |
| EP | 0605081 | 7/1994 |
| EP | 0739933 | 10/1996 |
| EP | 0884365 A2 | 12/1998 |
| EP | 0908490 | 4/1999 |
| EP | 0921144 A1 | 6/1999 |
| EP | 1076670 | 2/2001 |
| EP | 1152035 A1 | 11/2001 |
| GB | 2165547 | 4/1986 |
| JP | 56-16546 | 2/1981 |
| JP | 61-228061 | 10/1986 |
| JP | 4-114057 | 4/1992 |
| JP | 4-173134 | 6/1992 |
| JP | 1999236440 A | 8/1999 |
| WO | WO 93 23449 | 11/1993 |
| WO | WO 97/24312 | 7/1997 |
| WO | WO 98 08895 | 3/1998 |
| WO | WO 99/57173 | 11/1999 |
| WO | WO 2000 20501 | 4/2000 |
| WO | WO 2000 44831 | 8/2000 |
| WO | WO 2000 47677 | 8/2000 |
| WO | WO 2000 50514 | 8/2000 |
| WO | WO 01/21680 A1 | 3/2001 |
| WO | WO 2001 30899 | 5/2001 |
| WO | WO 01/46306 | 6/2001 |
| WO | WO 01/46306 A1 | 6/2001 |
| WO | WO 01/47688 A2 | 7/2001 |

OTHER PUBLICATIONS

Pigment Handbook, 1973, pp. 323-349, vol. 1, John Wiley and Sons, New York.

Encyclopedia of Chemical Technology, 4$^{th}$ Edition, vol. 4, pp. 1015-1037, John Wiley and Sons, New York.

Fred W. Billmeyer, Jr., Principles of Color Technology, 1981, pp. 25-66, John Wiley and Sons, New York.

* cited by examiner

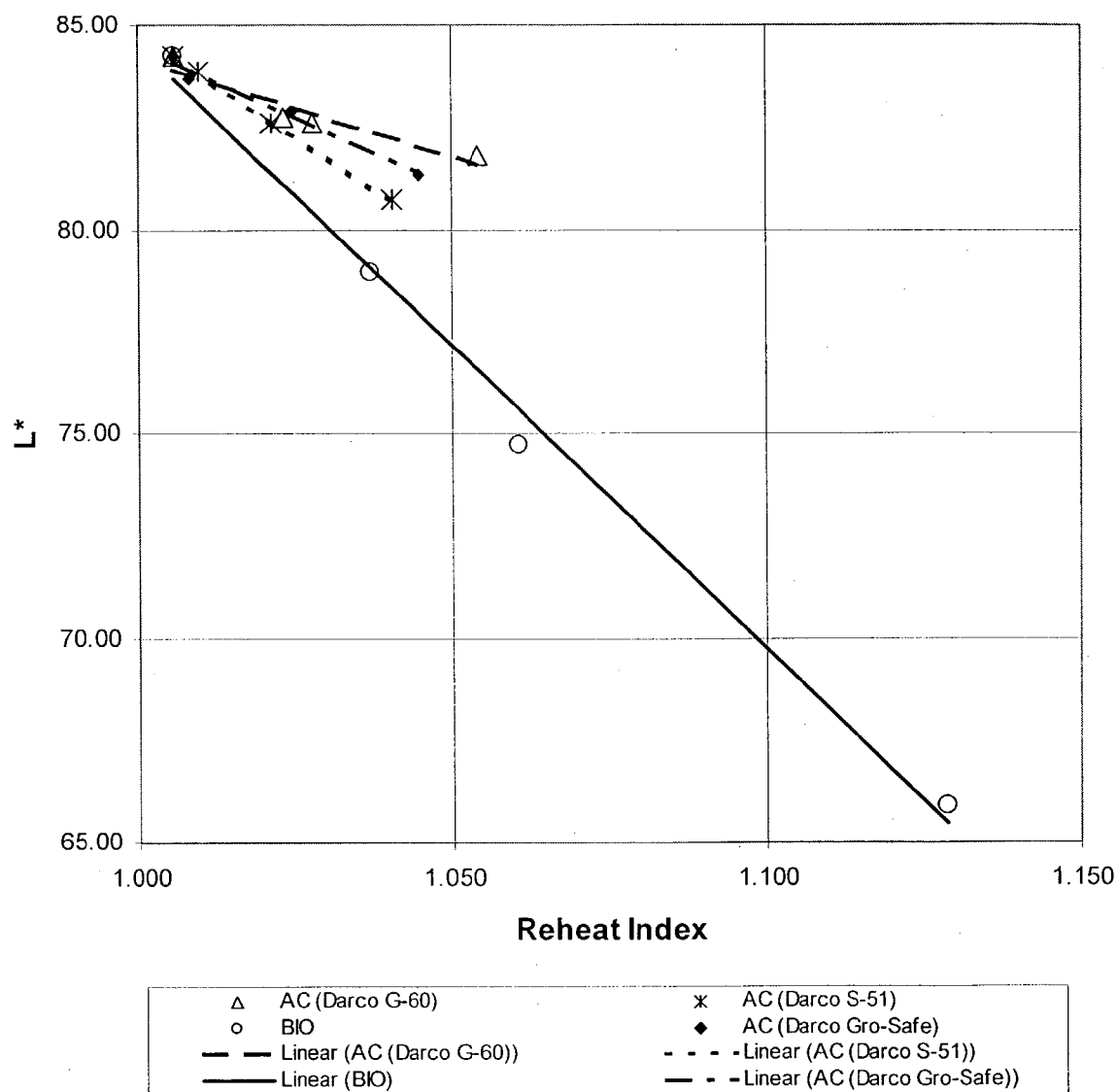

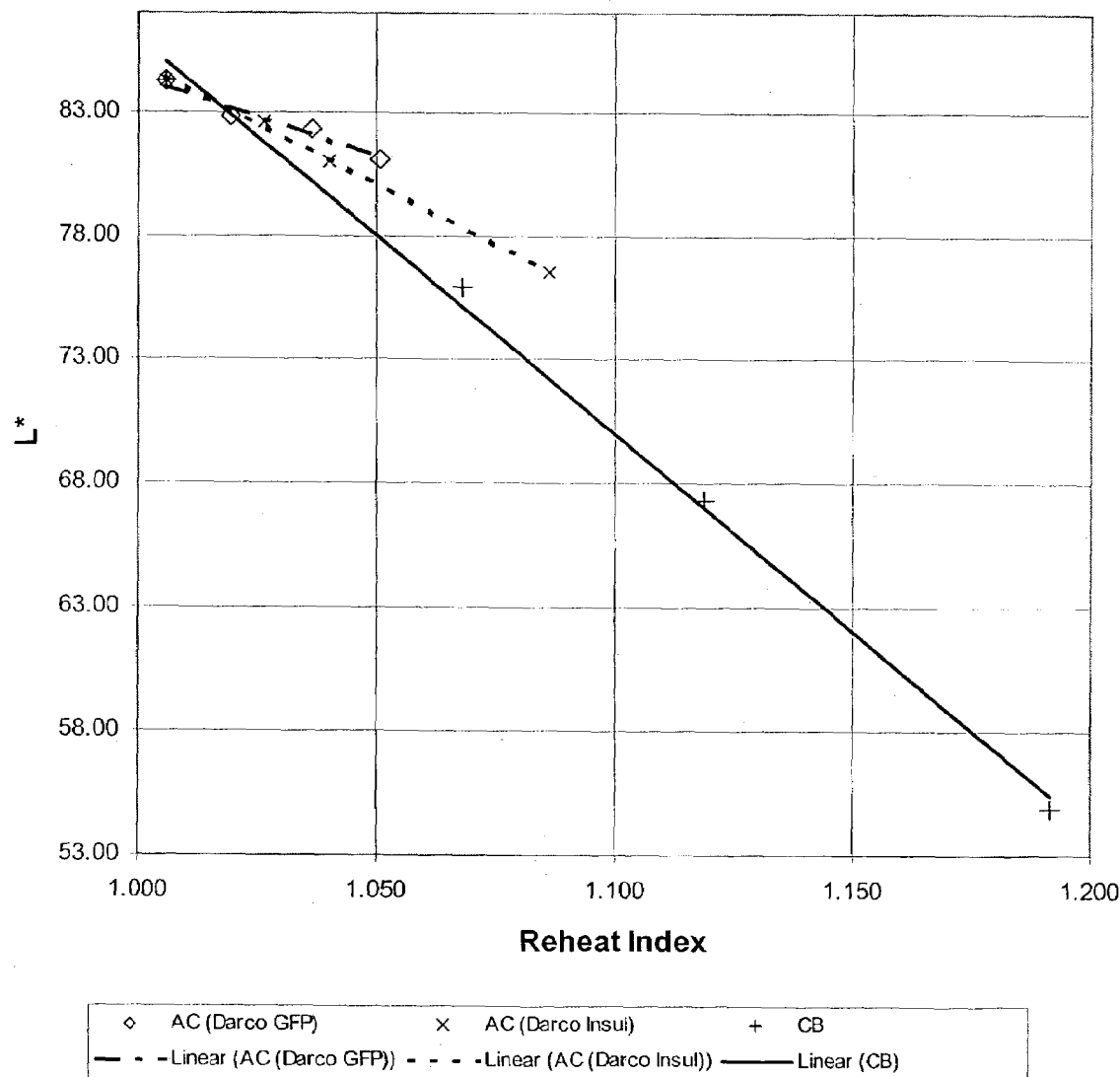

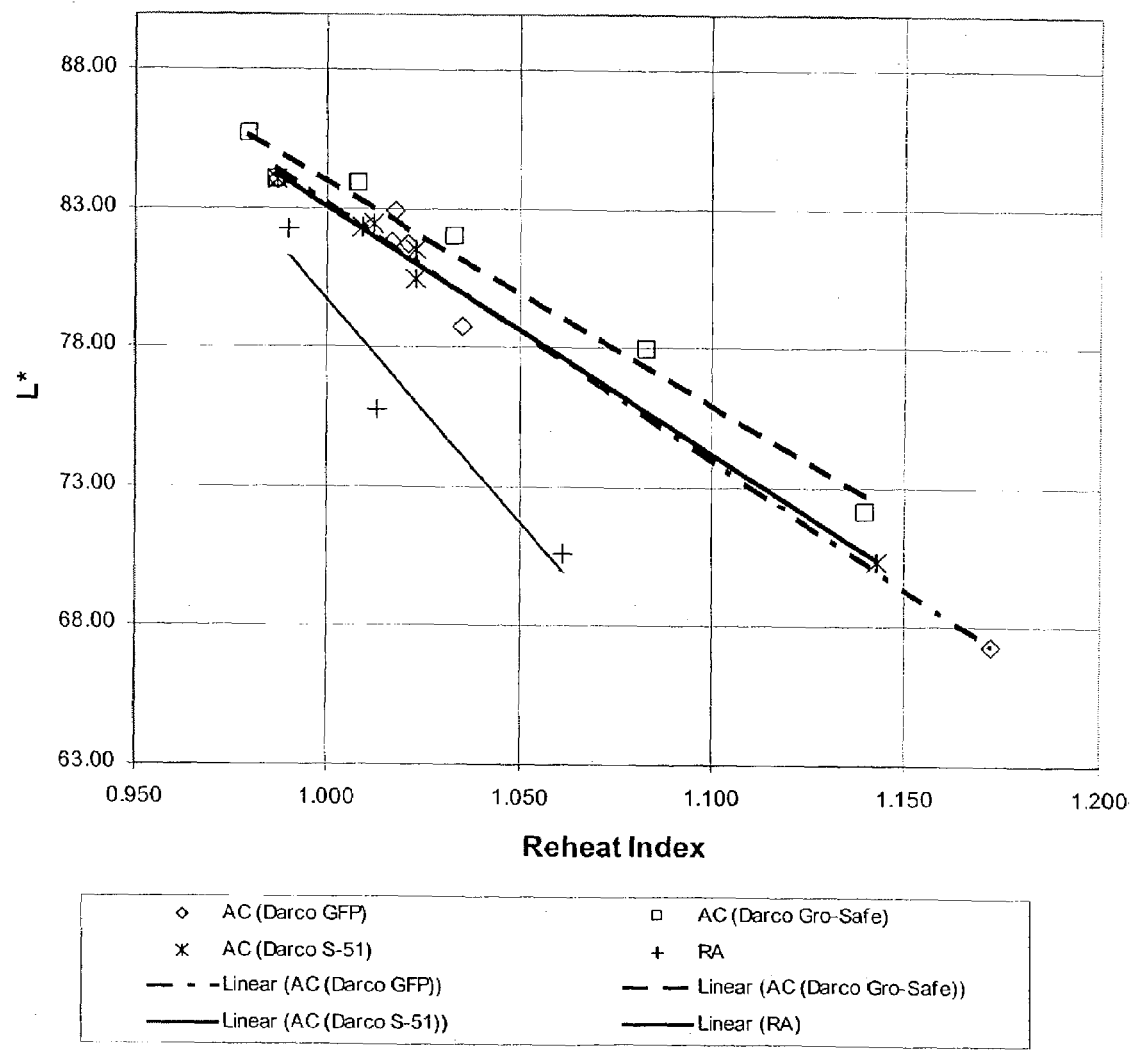

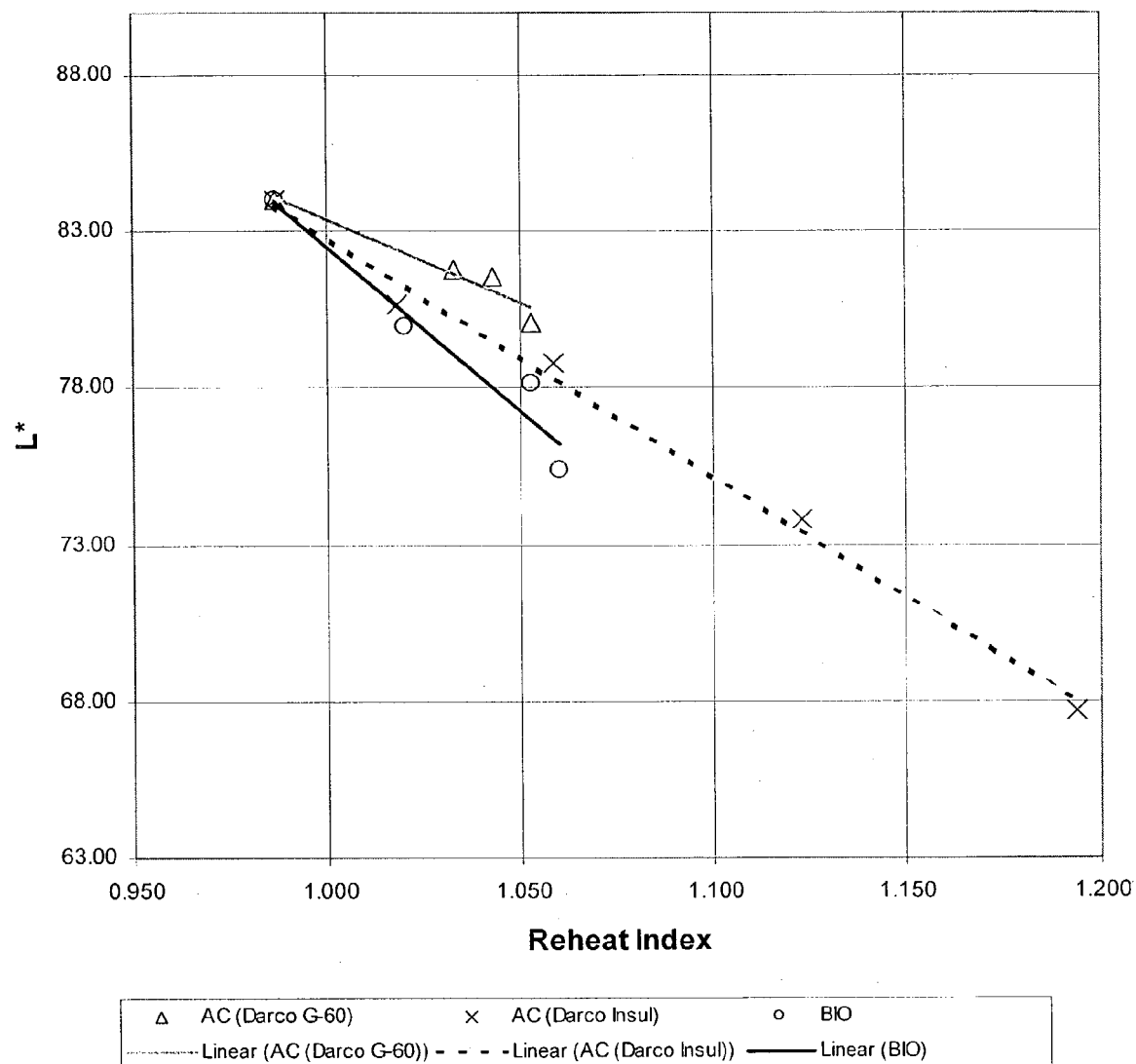

COMPOSITIONS AND METHOD FOR IMPROVING REHEAT RATE OF PET USING ACTIVATED CARBON

1. BACKGROUND OF THE INVENTION

Polyethylene terephthalate (PET) is formed into containers using a two-step process. First, a tube-shaped preform is injection molded. Second, the preform is heated above its glass transition temperature and blown into a mold with high pressure air in order to shape it into a bottle.

A quartz infrared lamp is used to "reheat" the preform in the second stage. Typical lamp temperatures are 2500–3000° K, having a broad emission spectrum in the range of 500 to 2000 nm. The emission maximum is around 900 to 1000 nm. PET absorbs energy poorly in the region of 500–2000 nm. Thus, in order to maximize energy absorption from the lamps and increase the preform's "reheat" rate, infrared absorbing compounds are sometimes added to PET. Unfortunately, these materials also cause a negative effect on the visual appearance of the PET bottle, causing it to darken (lower L*). Thus, there remains a need to improve the reheat rate of PET preforms while minimizing the impact such an additive would have on L*.

2. BRIEF SUMMARY OF THE INVENTION

We have found a means and additive to improve the reheat rate of PET compositions while minimizing the impact of the additive on the L* brightness of the composition. We have also found that this same additive may provide a measure of free acetaldehyde reduction following thermal processing conditions, in addition to providing improved reheat rate without causing significant loss in polymer brightness (L*) levels.

There is now provided a polyester composition, including a melt, solids, preforms, sheets suitable for thermoforming, and bottles, comprising a polyester polymer and activated carbon having a $d_{50}$ particle size of more than 2 μm.

There is also provided a process for the manufacture of a polyester composition comprising a polyester polymer comprising a polyalkylene terephthalate or naphthalate polymer, comprising adding activated carbon having a particle size of more than 2 μm to a melt phase for the manufacture of said polyester polymer, to said polyester polymer in the form of solid-stated pellets, or to an injection molding machine for the manufacture of preforms from said polyester polymer.

In another embodiment, there is provided a process for the manufacture of a polyester composition containing polyester polymers such as a polyalkylene terephthalate or naphthalate polymer made by transesterifying a dialkyl terephthalate or dialkyl naphthalate or by directly esterifying terephthalic acid or naphthalene dicarboxylic acid. The polyester polymer composition is made by adding activated carbon to a melt phase for the manufacture of the polyester polymer in the presence of an active phosphorus containing compound.

In yet another embodiment, activated carbon is added:
 a) to an esterification zone, a prepolymerization zone, or at any point in between these two zones, simultaneous with a phosphorus containing compound, or
 b) an esterification zone before a phosphorus containing compound is added to the esterification zone, wherein the phosphorus containing compound is added prior to completing the esterification reaction to the desired degree of esterification, or
 c) after the addition of the phosphorus compound to a reaction mixture in an esterification zone or a prepolymerization zone provided that the reaction mixture contains an active phosphorus containing compound.

There is also provided a process for the manufacture of a polyester composition comprising a polyester polymer comprising a polyalkylene terephthalate polymer or a polyalkylene naphthalate polymer, comprising adding activated carbon to:
 a) the melt phase for the production of said polyester polymer after the prepolymer zone, or
 b) to precursor or solid stated polyester solids by melt blending, or
 c) or to an injection molding machine for the manufacture of bottle preforms.

In another embodiment, there is now provided a polyester concentrate composition comprising activated carbon in an amount ranging from 0.15 wt. %, preferably at least 0.2 wt. %, and up to about 35 wt. % based on the weight of the concentrate composition and a thermoplastic polymer solid at 25° C. in an amount of at least 65 wt. % based on the weight of the concentrate composition.

With respect to a concentrate, there is also provided a process for making a polyester preform, comprising feeding a liquid or solid bulk polyester and a liquid, molten or solid polyester concentrate composition to a machine for manufacturing the preform, said concentrate comprising activated carbon and a polyester polymer in an amount of at least 65 wt. % based on the weight of the concentrate composition.

Not only may the concentrate be added at the stage for making preforms, but in another embodiment, there is provided a process for the manufacture of a polyester composition, comprising adding a concentrate polyester composition to a melt phase for the manufacture of virgin polyester polymers, said concentrate comprising activated carbon and at least 65 wt. % of a polyester polymer.

3. BRIEF DESCRIPTION OF THE DRAWINGS

FIG. 1 is a plot of Reheat Index vs. L* for Reheat Agents in PET A.

FIG. 2 is a plot of Reheat Index vs. L* for Reheat Agents in PET A.

FIG. 3 is a plot of Reheat Index vs. L* for Reheat Agents in PET B.

FIG. 4 is a plot of Reheat Index vs. L* for Reheat Agents in PET B.

4. DETAILED DESCRIPTION

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary. It is also to be understood that the terminology used herein is for the purpose of describing particular embodiments only and is not intended to be limiting.

It must also be noted that, as used in the specification and the appended claims, the singular forms "a," "an," and "the" include plural referents unless the context clearly dictates otherwise. For example, reference to processing a thermoplastic "preform," "container" or "bottle" is intended to include the processing of a plurality of thermoplastic preforms, articles, containers or bottles.

By "comprising" or "containing" is meant that at least the named compound, element, particle, etc. must be present in the composition or article, but does not exclude the presence of other compounds, materials, particles, etc., even if the other such compounds, material, particles, etc. have the same function as what is named.

The intrinsic viscosity values described throughout this description are set forth in dL/g units as measured at 25° C. in 60/40 wt/wt phenol/tetrachloroethane.

The "polyester composition" of this invention is any thermoplastic polymer, optionally containing any number of ingredients in any amount provided that the thermoplastic polymer is present in an amount of at least 30 wt % based on the weight of the polyester composition, wherein the backbone of said thermoplastic polymer has repeating terephthalate or naphthalate units. Examples of suitable thermoplastic polymers include polyethylene terephthalate (PET), polyethylene naphthalate (PEN), and copolyesters and blends of PET and PEN. The form of the polyester composition is not limited, and includes a melt in the manufacturing process or in the molten state after polymerization, such as may be found in an injection molding machine, and in the form of a liquid, pellets, preforms, and/or bottles. Polyester pellets are isolated as a solid at 25° C. and 1 atm in order for case of transport and processing. The shape of the polyester pellet is not limited, and is typified by regular or irregular shaped discrete particles and may be distinguished from a sheet, film or fiber.

A $d_{50}$ particle size is the median diameter, where 50% of the volume is composed of particles larger than the stated $d_{50}$ value, and 50% of the volume is composed of particles smaller than the stated $d_{50}$ value.

There is now provided a polyester composition, which includes but is not limited to a melt, pellets, sheets, preforms and bottles, comprising activated carbon having a $d_{50}$ particle size of more than 2 μm.

Activated carbon is a form of carbon with extremely large internal surface area and pore volume ("Encyclopedia of Chemical Technology", Fourth Edition, Volume 4, pp. 1015-1037, John Wiley and Sons). Commercial activated carbon is produced from organic materials such as coal, lignite, wood, nut shells, peat, pitches and cokes. Preparation of activated carbon occurs in two steps: thermal decomposition of the precursor material to form a crude char, and gasification by exposing the char to an oxidizing atmosphere that greatly increases the pore volume and surface area of the product.

Suitable forms of activated carbon include but are not limited acid washed activated carbon powders made by steam activation of lignite coal. The structure of activated carbon is described as a twisted network of defective carbon layer planes, cross-linked by aliphatic bridging groups. The morphology of many activated carbon forms can be described as a combination of amorphous particles and graphite crystallites having a very large pore volume or surface area and low density partly due to the irregular twisted network of carbon planes.

The preferred quality of the activated carbon is such as is commercially used for treating pharmaceutical intermediates and in food contact applications, such as the purification of sugar solutions and corn syrups, and for treating drinking water.

The location of the activated carbon particles within a polyester polymer is not limited. Activated carbon may be disposed anywhere on or within the polyester polymer, pellet, preform, or bottle. Preferably, the polyester polymer in the form of a pellet forms a continuous phase. By being distributed "within" the continuous phase is meant that activated carbon is found at least within a portion of a cross-sectional cut of the pellet as opposed to being disposed only on a surface as would normally be expected for a coating. Activated carbon may be distributed within the polyester polymer randomly, distributed within discrete regions, or distributed only within a portion of the thermoplastic polymer. Alternatively, activated carbon may be disposed on the surface of the polyester polymer. In the preferable embodiment, activated carbon is disposed randomly throughout the polyester polymer composition as by way of adding activated carbon to a melt, or mixing activated carbon with a solid polyester composition followed by melting and mixing.

The specific surface area, density, quantity, and particle size of the activated carbon suitable for use as a reheat agent is not particularly limited. However, it is highly desirable to use a form of activated carbon which improves the rate of reheat to a reheat index of 1.05 or more, more preferably 1.08 or more, while maintaining an L* brightness of 70 or more when measured at a reheat index of 1.05. The reheat index is the ratio of the average increase in the temperature of a test sample containing activated carbon after exposure to a radiant energy source compared to a control polymer specified below without the presence of activated carbon or any other reheat rate enhancing additive.

The reheat index is measured and calculated as follows for purpose of determining the reheat index value and for the purpose of ascertaining the L* at a reheat index of 1.05 or other value. The polymer sample and the control sample are injection molded into two sets of three discs 3 cm diameter each with a thickness of 67 mils (1 mil=0.001 inches). The discs should be set aside for 24 hours to equilibrate to ambient temperature. Both the control discs and test sample discs at each level of reheat additive are treated as follows. Each disc is placed onto a support contacting the molded item only along its edges. An actuator automatically moves the disc beneath a pyrometer and measures the initial temperature ($T_i$). The disc is then moved to a fixed distance below a lamp equipped with a bulb (GE DYH projection bulb, 250-W, 120-V) operating at 60V and exposed to radiant light for 20 seconds. The color temperature of the lamp is approximately 2200° C. After heating, the disc is automatically returned to the pyrometer where the surface temperature of the center area of the side which faced the lamp (front side) is recorded two seconds after the lamp is turned off ($T_f$). A 90-second cooling cycle is used between consecutive tests, during which a fan cools the lamp housing prior to loading the next sample. The reported temperature is the average temperature obtained from each of the three discs. The reheat index of the sample is calculated by the following equation:

$$\text{Reheat Index} = (T_f - T_i)_{sample} / (T_f - T_i)_{control}$$

where the control material used as the reference is polyethylene terephthalate polymer having an It.V. of about 0.80 dL/g, wherein the polymer is modified with 1.5 mole % cyclohexanedimethanol, prepared from purified terephthalic acid, catalyzed with an antimony compound, without the addition of a reducing agent to intentionally form reduced antimony metal from the antimony catalyst, and not containing activated carbon or any other added reheat rate enhancing additive. The control discs are tested in the exact same manner as the test sample discs.

Suitable amounts of activated carbon in the polyester composition (other than polyester concentrate compositions as discussed below), preforms and containers range from 0.5–250 ppm based on the weight of the all the polyester polymers in the polyester composition. The optimal amount of activated carbon used will depend on the type and quality of activated carbon, the particle size and surface area, the morphology of the particle, and the level of reheat rate improvement desired. Typical amounts range from 3 to 100 ppm, and for most applications, suitable amounts of activated carbon range from 10 to 50 ppm.

The $d_{50}$ particle size of the activated carbon can be up to about 100 µm. The particle size can be measured with a laser diffraction type particle size distribution meter. Alternatively, the particle size can be correlated by a percentage of particles screened through a mesh. Activated carbon having a particle size distribution in which at least 80%, preferably at least 90%, more preferably at least 95% of the particles fall through a 140 standard US sieve are suitable for use as reheat agents. Activated carbon having a particle size distribution in which at least 80%, preferably at least 90%, more preferably at least 95% of the particles fall through a 325 standard US sieve are also suitable for use as reheat agents.

The activated carbon used in the invention not only enhances the reheat rate of a preform, but rather unexpectedly has only a minimal impact on the brightness of the preforms and bottles by not reducing the L* below acceptable levels. An acceptable L* value of preforms or bottles is deemed 70 or more when measured at a reheat index of 1.05, preferably 1.08.

The impact of any additive, including activated carbon, on the L*color can be judged using the CIE color standard L* values. The L* value is a measure of brightness. This value is measured in accordance with ASTM D-2244-93. Color measurement theory and practice are discussed in greater detail in "Principles of Color Technology", pp. 25–66, John Wiley & Sons, New York (1981) by Fred W. Billmeyer, Jr. Brightness is measured as L* in the CIE 1976 opponent-color scale, with 100% representing a perfect white object reflecting 100% at all wavelengths, or a colorless sample transmitting 100% at all wavelengths. An L* of 100 in a colorless sample would be perfectly transparent, while an L* of 0 in a colorless sample would be opaque.

To determine the L* value of a particular polyester composition, whether in the form of a melt, pellet, preform, or bottle, the polyester composition is analyzed according to the following method. L* is measured on molded discs 3 cm diameter with a thickness of 67 mils. A HunterLab UltraScan spectrocolorimeter is used to measure L* on three discs stacked together (approximately 201-mil thickness). The instrument is operated using a D65 illuminant light source with a 10° observation angle and integrating sphere geometry. The color measurements are made in the total transmission (TTRAN) mode, in which both light transmitted directly through the sample and the light that is diffusely scattered is measured. The three discs are stacked together in front of the light source, with the area of largest surface area placed perpendicular to the light source.

In another embodiment, we have also found that the activated carbon not only enhances the reheat rate of a perform with a minimal impact on the brightness of the preforms and bottles by not reducing the L* below acceptable levels, but can provide an additional but not essential benefit by measurably decreasing the amount of free acetaldehyde present following thermal processing conditions. Acetaldehyde (AA) is an undesirable byproduct of the decomposition of PET at thermal processing conditions. If the concentration of AA is too high, it can negatively affect the flavor of the beverage packaged in the PET container. This is most noticeable in unflavored beverages, such as water. Thus, an additive that can decrease the amount of AA in PET that has been thermally processed is highly desirable. The thermal processing of PET can occur at any stage once the PET polymer is made to an It.V. of about 0.35 or more and is molten, such as in a polycondensation finisher, during pellet extrusion, or in an injection molding machine for making performs.

Thus, in this other embodiment, there is provided a polyester composition, which includes but is not limited to a melt, pellets, sheets, preforms and bottles, comprising activated carbon having a $d_{50}$ particle size of more than 2 µm and having an AA level reduced by at least 5%, more preferably by at least 10%, most preferably by at least 15%, relative to AA level in the same composition without said activated carbon.

The method used for purposes of determining the level of AA in the PET composition is the French National Method test method. Extruded samples are cryogenically ground through a Wiley Mill equipped with a 1.0 mesh screen. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated.

In another embodiment, there is provided polyester composition, whether in the form of a melt, pellets, sheet, a preform and/or a bottle, comprising from 0.5 ppm, or at least 3 ppm, or at least 10 ppm activated carbon having a $d_{50}$ particle size of more than 2 µm, or 3 µm or greater, or 5 µm or greater, and up to 100 µm, but preferably 50 µm or less, and more preferably 35 µm or less, wherein the polyester composition has an L* value of 70 or more, preferably 75 or more, most preferably 80 or more, when measured at a reheat index of 1.05, more preferably at a reheat rate index of 1.08.

As noted, the specific surface area of the activated carbon particles is not particularly limited. However, it is desirable to increase the surface area of the particle to absorb infrared energy at a faster rate. Activated carbon having a specific surface area of more than 500 $m^2$ µg is suitable, as well as those having a specific surface area of 1000 $m^2/g$.

In a first process embodiment of the invention, activated carbon having a particle size of more than 2 µm is added at any point in the melt phase, which includes the esterification zone, to the polycondensation zone comprised of the prepolymer zone and the finishing zone, to or prior to the pelletizing zone, and at any point between these zones. Activated carbon can also be added to solid-stated pellets as they are exiting the solid-stating reactor. Furthermore, activated carbon may be added to the PET pellets in combination with other feeds to the injection molding machine or fed separately to the injection molding machine. For clarification, the activated carbon may be added in the melt phase or to an injection molding machine without solidifying and isolating the polyester composition into pellets. Thus, activated carbon can also be added in a melt to mold process at any point in the process for making the preforms. In each instance at a point of addition, the activated carbon can be added as a powder neat, in a liquid or polymer concentrate, and can be added to virgin or recycled PET, or added as a polymer concentrate using virgin or recycled PET as the PET polymer carrier. In each case in this first process embodiment, the activated carbon has a particle size of more than 2 µm.

In a second embodiment, there is provided a process for the manufacture of a polyester composition containing polyester polymers such as a polyalkylene terephthalate or naphthalate polymer made by transesterifying a dialkyl terephthalate or dialkyl naphthalate or by directly esterifying terephthalic acid or naphthalene dicarboxylic acid. The polyester polymer composition is made by adding activated carbon to a melt phase for the manufacture of the polyester polymer in the presence of an active phosphorus containing compound. By an active phosphorus containing compound is meant a phosphorus compound actively reacting or capable of reacting with metal compounds present in the melt and/or active to decrease the catalytic activity of activated carbon (to the extent that activated carbon has catalytic activity) as activated carbon is added to the melt phase.

In the conventional method for making a polyester, phosphorus containing compounds are generally added to the melt phase usually no later than the prepolymerization zone to react with metal compounds present in the reaction mixture which, if left untreated, form color bodies in the melt as well as catalyze the formation of acetaldehyde, both of which are undesirable. Thus, phosphorus containing compounds have been referred to as stabilizers. In a DMT-based process, the transesterification catalyst is usually completely blocked upon completion of the transesterification reaction because the catalyst is active to form color bodies. In a direct esterification reaction, it has been found useful to add phosphorus containing compounds to the melt phase to prevent metal compounds present in the reaction mixture in trace amounts as impurities from forming color bodies. However, phosphorus containing compounds not only react with the metal compound impurities in the melt, but also with the esterification and the polycondensation metal catalysts. Nevertheless, polyester compositions may be manufactured having acceptable L* and reheat rates even when activated carbon is added to the melt phase in the presence of an active phosphorus compound capable of reducing the catalytic activity of activated carbon.

Thus, in this embodiment, activated carbon can be added to the melt phase in a variety of sequences and stages relative to the phosphorus containing compound. For example, activated carbon can be added:
  a) to an esterification zone, a prepolymerization zone, or at any point in between these two zones, simultaneous with a phosphorus containing compound, or
  b) an esterification zone before a phosphorus containing compound is added to the esterification zone, wherein the phosphorus containing compound is added prior to completing the esterification reaction to the desired degree of esterification, or
  c) after the addition of the phosphorus compound to a reaction mixture in an esterification zone or a prepolymerization zone provided that the reaction mixture contains an active phosphorus containing compound.

In a third process embodiment, there is provided a process for making a polyalkylene terephthalate or naphthalate polymer composition by transesterifying a dialkyl terephthalate or naphthalate or directly esterifying a terephthalic acid or naphthalene dicarboxylic acid with a diol, adding activated carbon (having any particle size) to the melt phase for the production of a polyalkylene terephthalate or naphthalate after the prepolymer zone, or to polyalkylene terephthalate or naphthalate solids, or to an injection molding machine for the manufacture of bottle preforms.

Each of these process embodiments along with a description of the polyester polymers is now explained in further detail.

The polyester polymer is preferably PET, PEN, or a mixture or copolymer thereof. The most preferred polyester polymer is polyethylene terephthalate. As used herein, a polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Preferably, the polymer contains ethylene terephthalate or naphthalate units in an amount of at least 85 mole %, more preferably at least 90 mole %, and most preferably at least 92 mole %, as measured by the mole % of ingredients added to the reaction mixture. Thus, a polyethylene terephthalate polymer may comprise a copolyester of ethylene terephthalate units and other units derived from an alkylene glycol or aryl glycol with a aliphatic or aryl dicarboxylic acid.

While reference for exemplary purposes is made to polyethylene terephthalate, it is to be understood that the polymer may also be a polyalkylene naphthalate polymer. Polyethylene terephthalate can be manufactured by reacting a diacid or diester component comprising at least 60 mole % terephthalic acid or $C_1$–$C_4$ dialkylterephthalate, preferably at least 70 mole %, more preferably at least 85 mole %, even more preferably, at least 90 mole %, and for many applications will be at least 95 mole %, and a diol component comprising at least 60 mole % ethylene glycol, preferably at least 70 mole %, more preferably at least 85 mole %, even more preferably at least 90 mole %, and for many applications, will be at least 95 mole %. It is also preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates, PEN, or mixtures thereof, along with other thermoplastic polymers such as polycarbonate (PC) and polyamides. It is preferred that the polyester composition should comprise a majority of a polyalkylene terephthalate polymers or PEN polymers, more preferably in an amount of at least 80 wt. %, most preferably at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the present polyester may be modified with units derived from one or more additional dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid".

In addition to units derived from ethylene glycol, the diol component of the present polyester may be modified with units from additional diols including cycloaliphatic diols preferably having 6 to 20 carbon atoms and aliphatic diols preferably having 3 to 20 carbon atoms. Examples of such diols include diethylene glycol; triethylene glycol; 1,4-cyclohexanedimethanol; propane-1,3-diol;butane-1,4-diol;

pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate polymer are made by reacting a glycol with a dicarboxylic acid as the free acid or its dimethyl ester to produce an ester monomer, which is then polycondensed to produce the polyester. If required, the molecular weight of the polyester can then be increased further by solid state polymerization. After melt phase and/or solid state polycondensation the polyesters polymer compositions preferably have an intrinsic viscosity (It.V.) ranging from 0.55 dL/g to about 0.70 dL/g as precursor pellets, and an It.V. ranging from about 0.70 dL/g to about 1.15 dL/g for solid stated pellets.

The polyester compositions of the invention can be prepared by conventional polymerization procedures well-known in the art sufficient to effect esterification and polycondensation. Polyester melt phase manufacturing processes include direct condensation of a dicarboxylic acid with the diol optionally in the presence of esterification catalysts in the esterification zone, followed by polycondensation in the prepolymer and finishing zones in the presence of a polycondensation catalyst; or ester interchange usually in the presence of a transesterification catalyst in the esterification zone, followed by prepolymerization and finishing in the presence of a polycondensation catalyst, and each may optionally be solid stated according to known methods.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts. Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus containing compounds. The relative amounts of BHET and oligomeric species will vary depending on whether the process is a direct esterification process in which case the amount of oligomeric species are significant and even present as the major species, or a transesterification process in which case the relative quantity of BHET predominates over the oligomeric species. The water is removed as the esterification reaction proceeds and excess ethylene glycol is removed to provide favorable equilibrium conditions. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain monomeric species is bis(2-hydroxyethyl) naphthalate and its corresponding oligomers. Once the ester monomer is made to the desired degree of esterification, it is transported from the esterification reactors in the esterification zone to the polycondensation zone comprised of a prepolymer zone and a finishing zone. Polycondensation reactions are initiated and continued in the melt phase in a prepolymerization zone and finished in the melt phase in a finishing zone, after which the melt is solidified into precursor solids in the form of chips, pellets, or any other shape. For convenience, solids are referred to as pellets, but it is understood that a pellet can have any shape. If desired, the polycondensation reaction may be continued by solid stating the precursor pellets in a solid stating zone.

Although reference is made herein to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus containing compounds, cobalt compounds, and colorants can also be added in the prepolymerization zone. These compounds may, however, be added in the finishing zone instead of or in addition to the prepolymerization zone. In a typical DMT-based process, those skilled in the art recognize that other catalyst material and points of adding the catalyst material and other ingredients vary from a typical direct esterification process.

Typical polycondensation catalysts include the compounds of Sb, Ti, Ge, Zn and Sn in an amount ranging from 0.1 to 1000 ppm based on the weight of resulting polyester polymer. A common polymerization catalyst added to the prepolymerization zone is an antimony-based polymerization catalyst. Suitable antimony based catalyst include antimony (III) and antimony (V) compounds recognized in the art and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 and about 400 ppm of antimony by weight of the resulting polyester.

This prepolymer polycondensation stage generally employs a series of two or more vessels and is operated at a temperature of between about 250° C. and 305° C. for between about one and four hours. During this stage, the It.V. of the monomers and oligomers is increased up to about no more than 0.35. The diol byproduct is removed from the prepolymer melt using an applied vacuum ranging from 15 to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to $CO_2$, argon, helium and nitrogen.

Once an It.V. of no greater than 0.35 is obtained, the prepolymer is fed from the prepolymer zone to a finishing zone where the second half of polycondensation is continued in one or more finishing vessels ramped up to higher temperatures than present in the prepolymerization zone, to a value within a range of from 280° C. to 305° C. until the It.V. of the melt is increased from the It.V of the melt in the prepolymerization zone (typically 0.30 but usually not more than 0.35) to an It.V in the range of from about 0.50 to about 0.70 dL/g. The final vessel, generally known in the industry as the "high polymerizer," "finisher," or "polycondenser," is operated at a pressure lower than used in the prepolymerization zone within a range of between about 0.8 and 4.0 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is connected to a flash vessel and each is typically agitated to facilitate the removal of ethylene glycol. The residence time in the polycondensation vessels and the feed rate of the ethylene glycol and terephthalic acid into the esterification zone in a continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt is fed to a pelletization zone where it is filtered and extruded into the desired form. The polyester polymers of the present invention are filtered to remove particulates over a designated size, followed by extrusion in the melt phase to form polymer sheets, filaments, or pellets. Although this zone is termed a "pelletization zone" it is understood that this zone is not limited to solidifying the melt into the shape of pellets, but rather includes solidification into any desired shape. Preferably, the polymer melt is extruded immediately after polycondensation. After extrusion, the polymers are quenched, preferably by spraying with water or immersing in a water trough, to promote solidification. The solidified condensation polymers are cut into any desired shape, including pellets.

As will be known to those of ordinary skill in the art, the pellets formed from the condensation polymers, in some circumstances, may be subjected to a solid stating zone wherein the solids are first crystallized followed by solid state polymerization (SSP) to further increase the It.V. of the polyester composition solids from the It.V exiting the melt phase to the desired It.V. useful for the intended end use. Typically, the It.V. of solid stated polyester solids ranges from 0.70 to 1.15 dL/g.

Thereafter, polyester polymer solids, whether solid stated or not, are re-melted and re-extruded to form items such as containers (e.g., beverage bottles), filaments, films, or other applications. At this stage, the pellets are typically fed into an injection molding machine suitable for making performs which are stretch blow molded into bottles.

As mentioned above in the first process embodiment, activated carbon having a particle size of more than 2 µm may be added at any point in the melt phase or thereafter. Thus, activated carbon having a particle size of more than 2 µm can be added to the esterification zone, to the prepolymerization zone, to the finishing zone, and to the pelletizing zone, or at any point between each of these zones, such as to metering devices, pipes, and mixers. Activated carbon can also be added to the pellets in a solid stating zone within the solid stating zone or as the pellets exit the solid-stating reactor. Furthermore, activated carbon may be added to the pellets in combination with other feeds to the injection molding machine or fed separately to the injection molding machine.

If the activated carbon is added to the melt phase, it is desirable to use activated carbon having a small enough $d_{50}$ particle size to pass through the filters in the melt phase, and in particular the pelletization zone. In this way, the particles will not clog up the filters as seen by an increase in gear pump pressure needed to drive the melt through the filters. However, if desired, the activated carbon can be added after the pelletization zone filter and before or to the extruder.

In the second process embodiment, activated carbon of any $d_{50}$ particle size can be added either together with a phosphorus containing compound to the esterification zone, the prepolymer zone, or at any point in between, or after the addition of a phosphorus compound to the esterification zone prior to completing the esterification reaction to the desired degree, or after the addition of the phosphorus compound to any zone and to a reaction mixture containing an active phosphorus compound. Since activated carbon is used as a reheat agent rather than as a catalyst, activated carbon may be added to the melt phase in the presence of other compounds which are active to decrease the catalytic activity of activated carbon, if any, and/or which are reactive with metal compounds present in the melt. The point at which activated carbon is added, or the presence or absence of such other active compounds in the melt, is not limited since activated carbon functions to enhance the rate of reheat. The function of activated carbon as a reheat enhancing additive allows a wide operating window and flexibility to add activated carbon at any convenient point even in the presence of a active phosphorus containing compounds in the melt phase. Thus, activated carbon may be added together with phosphorus compounds either as a mixture in a feedstock stream to the esterification or prepolymer zone, or as separate feeds but added to the reaction mixture within the zone simultaneously. Alternatively, activated carbon may be added to a reaction mixture within the esterification zone after a phosphorus compound has been added to the same zone and before completion of the esterification reaction. Phosphorus compounds may remain active within a particular zone either because the residence time is not long enough to bind all phosphorus containing compounds to an esterification or polycondensation catalyst or because a stoichiometric excess of phosphorus was added to the reaction mixture. For this reason, activated carbon may be added to any zone in which a phosphorus compound is present and active to bind or react with activated carbon or other metal compounds in the melt.

Typical phosphorus containing compounds added in the melt phase are acidic phosphorus-containing compounds recognized in the art. Suitable examples of such additives include phosphoric acid, phosphorous acid, polyphosphoric acid, carboxyphosphonic acids, and each of their derivatives including acidic phosphate esters such as phosphate mono- and di-esters and non acidic phosphate esters such as trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each, among others.

As mentioned above, in a third process embodiment, activated carbon (having any particle size) is added to the melt phase for the production of polyalkylene terephthalate or naphthalate after the prepolymer zone, or to polyalkylene terephthalate or naphthalate solids, or to an injection molding machine for the manufacture of bottle performs. Catalysts for esterification or polycondensation are added to the esterification zone or at the initiation of polycondensation in the prepolymer zone. Since activated carbon functions as a reheat enhancing additive, it may be added to the melt phase after the point at which catalysts must be added for catalyzing the esterification or polycondensation reaction, and not only to the melt phase post prepolymerization, but also to solids or to an injection molding machine for making preforms.

In each these process embodiments, activated carbon can be added neat in particulate form, in a liquid carrier such as ethylene glycol, or as a polymer concentrate. As a polymer concentrate, the activated carbon may be dispersed within the same type of polymer as the bulk polymer used for making the article and melt blended with the bulk polymer to promote uniform dispersion. The resulting concentrate is a solid at 25° C. Alternatively, activated carbon may be added to a polymer which is liquid at 25° C. to form a liquid concentrate. Rather than making a concentrate, activated carbon may be added to a diol as the carrier medium, followed by feeding the diol stream containing the activated carbon to the esterification zone, prepolymerization zone, in between these zones, and optionally with a phosphorus containing compound.

The polymer concentrate may be virgin polymer or post consumer recycled (PCR) polymer. Activated carbon may be fed to an extruder and dispersed in a melt of polyester followed by pelletizing to make a concentrate containing activated carbon in an amount from 0.15 wt. % to 35 wt. % based on the total weight of the polyester composition. This concentrate is isolated and used at a later time to uniformly disperse activated carbon into bulk polymer, such as by way of combining the solid concentrate and the solid bulk polymer at an injection molding zone to make performs. Activated carbon and solid concentrates may be combined with bulk polymer by way of pellet/pellet blending, pellet/flake blending, or adding activated carbon neat or in a liquid carrier to a melt of bulk polymer. Typical feed methods to an injection molding machine for making performs include feeding activated carbon to the molten polymer in the injection molding machine, or combining the activated carbon with a stream of bulk polymer fed to the injection molding machine, either by melt blending or by dry blending pellets.

The activated carbon, whether added neat or in a concentrate or in a carrier, may be dried prior to addition to the melt phase, prior to addition to bulk polymer, or prior to addition to form a concentrate, or if not dried prior to addition, then the concentrate may be dried prior to melt blending. The concentrates and the activated carbon may be dried prior to adding to the bulk polymer. These may be dried in an atmosphere of dried air or other inert gas, such as nitrogen, and if desired, under sub-atmospheric pressure.

With respect to concentrates, there is provided a concentrate composition comprising activated carbon in an amount of at least 0.15 wt. %, preferably at least 0.20 wt. %, and up to about 35 wt. %, or up to 20 wt. %, and a thermoplastic polymer normally solid at 25° C. and 1 atm such as a polyester, polyolefin, or polycarbonate, preferably a polyalkylene terephthalate or naphthalate polyester polymer, in an amount of at least 65 wt. % and preferably at least 80 wt. % and up to 99.5 wt. % and preferably up to 98 wt. %, each based on the weight of the concentrate composition. The concentrate may be in liquid or solid form. The converter of polymer pellets to preforms has the flexibility of adding activated carbon to bulk polyester at the injection molding stage continuously or intermittently, by either feeding solid or molten concentrate pellets to the injection molding machine along with a feed of bulk polyester polymer, or by solid/solid blending the solid concentrate with the solid bulk polyester polymer, or by feeding a liquid concentrate to the injection molding machine, and further custom adjusting the amount of activated carbon contained in the preform by metering the amount of concentrate to fit the end use application and customer requirement.

The concentrate may be made by mixing activated carbon with a thermoplastic polymer such as polycarbonate, a polyester, or a polyolefin, preferably a polyethylene terephthalate polymer or a polyalkylene naphthalate polymer, in a single or twin-screw extruder and optionally compounding with other reheat additives. A preferred polycarbonate is bisphenol A polycarbonate. Preferred polyolefins are polyethylene and polypropylene. Melt temperatures must be at least as high as the melting point of the polymer. For a polyester such as polyethylene terephthalate, the melt temperatures are typically in the range of 260°–310° C. Preferably, the melt compounding temperature is maintained as low as possible. The extrudate may be withdrawn in any form, such as a strand form, and recovered according to the usual way such as cutting.

Preferably, the concentrate is prepared in a similar polyester as that used in the final article. However, in some cases it may be advantageous to use another polymer in the concentrate, such as a polyolefin. In one embodiment, a portion of the melt stream exiting the finisher may be diverted from the pelletizer unit and combined with activated carbon to form a molten concentrate stream, or concentrate pellets may be added to the melt phase by first melting the pellets and feeding the melt phase as a liquid concentrate stream. In either case, a molten concentrate stream is added anywhere along the different stages for melt manufacturing polyethylene terephthalate, or to bulk polymer fed to an injection molding machine, in a manner such that the concentrate is most compatible with the bulk polyester or its precursors. For example, the molten concentrate stream may be added to the melt phase at a point where the It.V. of the polyethylene terephthalate and the It.V. of the molten concentrate are similar, such as +/−0.2 dL/g It.V., preferably +/−0.05 dL/g It.V. especially in the finishing zone, and It.V. is measured at 25° C. in a 60/40 wt/wt phenol/tetrachloroethane solution. A concentrate can be made with an It.V. ranging from 0.3 to 0.70 dL/g to match the typical It.V. of a polyethylene terephthalate under manufacture in the polycondensation stage. Alternatively, a concentrate can be made with an It.V. similar to that of solid stated pellets used at the injection molding stage (e.g. It.V. from 0.70 to 1.15 dL/g). consistent with earlier ranges) Many other ingredients can be added to the concentrate. For example, crystallization aids, impact modifiers, surface lubricants, denesting agents, compounds, antioxidants, ultraviolet light absorbing agents, metal deactivators, colorants such as titanium dioxide and carbon black, nucleating agents such as polyethylene and polypropylene, phosphate compounds, fillers, and the like, can be included herein. All of these additives and the use thereof are well known in the art.

In addition to adding activated carbon to virgin polymer, whether to make a concentrate or added neat to the melt phase after the prepolymerization reactors or to an injection molding zone, activated carbon may also be added to (PCR) polymer. PCR containing activated carbon is added to virgin bulk polymers by solid/solid blending or by feeding both solids to an extruder. Alternatively, PCR polymers containing activated carbon are advantageously added to the melt phase for making virgin polymer between the prepolymerization zone and the finishing zone. The It.V. of the virgin melt phase after the prepolymerization zone is sufficiently high at that point to enable the PCR to be melt blended with the virgin melt. Alternatively, PCR may be added to the finisher. In either case, the PCR added to the virgin melt phase contains activated carbon. Activated carbon may be combined with PCR by any of the methods noted above, or separately fed to and melt blended in a heated vessel, followed by addition of the PCR melt containing the activated carbon to the virgin melt phase at these addition points.

The polyester composition of the present invention may be used to form bottle preforms, also known as parisons, which are test tube shaped, generally injection molded or thermoformed articles. The preform comprises the polyester polymer and activated carbon. The preform preferably comprises activated carbon particles within the polyester polymer in an amount ranging from 0.5 ppm to 250 ppm.

The preform is typically heated to about 20° C. above the glass transition temperature of the polymer composition by passing the preform through a bank of quartz infrared heating lamps, positioning the preform in a bottle mold, and then blowing pressurized air through the open end of the mold, and in some cases, stretch blow molding the preform. The resulting bottle comprises the polyester polymer and activated carbon, preferably activated carbon particles in an amount ranging from 0.5 ppm to 250 ppm distributed within a continuous phase of polyester polymer.

A variety of articles can be made from the polyester polymer pellets. Articles include sheet, film, bottles, trays, other packaging, rods, tubes, lids, and injection molded articles. Any type of bottle can be made from the polyester composition of the invention. In one embodiment, there is provided a beverage bottle made from polyethylene terephthalate suitable for holding water. In another embodiment, there is provided a heat set beverage bottle suitable for holding beverages which are hot filled into the bottle.

If desired, crystallization of the preform finish can be performed either to the preform (as in the Yoshino process), to a pre-bottle (as in the Sidel SRCF process outlined in U.S. Pat. No. 5,382,157) or to an actual heat-set bottle. For example, a heat set bottle can be made by placing a preform into a warm or hot mold and stretched into a container. These bottles are typically designed to withstand hot-filling without shrinkage greater than about 1% by volume. It is also desirable, although not required, to achieve a large degree of spherulitic crystallinity in the bottle sidewall in order to resist thermal distortion upon hot-filling of the bottle.

For example, in a crystallization preform process, a preform is transported to a crystallization machine and loaded onto carriers which shield the bodies of the preforms against exposure to crystallizing heat, but leave the finishes exposed. The carriers, containing the preforms, are passed through the crystallizing machine, where the preform finishes are exposed to infrared energy for a sufficient amount of time to allow the finishes to crystallize. This stage preferably involves exposing at least a portion of the preform finish to radiant heat from lamps in a row of ovens (across a spectrum that may include the IR range) while protecting the body of the preform. The finish is heated to temperatures at which the selected polyester crystallizes rapidly (for PET about 150° C. to about 180° C.). This results in a highly crystalline finish. High levels of crystallinity give dimensional stability to the finish that enable the resulting container to be hot-filled without suffering from thermal distortion in the finish region.

Other components can be added to the composition of the present invention to enhance the performance properties of the polyester polymer. For example, crystallization aids, impact modifiers, surface lubricants, denesting agents, compounds, antioxidants, ultraviolet light absorbing agents, metal deactivators, colorants, nucleating agents, acetaldehyde reducing compounds, other reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition. It is preferable that the present composition be essentially comprised of a blend of thermoplastic polymer and activated carbon, with only a modifying amount of other ingredients being present.

Examples of other reheat rate enhancing additives used in combination with activated carbon include carbon black, antimony metal, tin, copper, silver, gold, palladium platinum, black iron oxide, and the like, as well as near infrared absorbing dyes, including, but not limited to those disclosed in U.S. Pat. No. 6,197,851 which is incorporated herein by reference.

The iron oxide, which is preferably black, is used in very finely divided form, e.g., from about 0.01 to about 200 μm, preferably from about 0.1 to about 10.0 μm, and most preferably from about 0.2 to about 5.0 μm. Suitable forms of black iron oxide include, but are not limited to magnetite and maghemite. Red iron oxide is less preferred as it imparts an undesirable red hue to the resultant polymer. Such oxides are described, for example, on pages 323–349 of Pigment Handbook, Vol. 1, copyright 1973, John Wiley & Sons, Inc.

The compositions of the present invention optionally may additionally contain one or more UV absorbing compounds. One example includes UV absorbing compounds which are covalently bound to the polyester molecule as either a comonomer, a side group, or an end group. Suitable UV absorbing compounds are thermally stable at polyester processing temperatures, absorb in the range of from about 320 nm to about 380 nm, and are nonextractable from said polymer. The UV absorbing compounds preferably provide less than about 20%, more preferably less than about 10%, transmittance of UV light having a wavelength of 370 nm through a bottle wall 12 mils (305 microns) thick. Suitable chemically reactive UV absorbing compounds include substituted methine compounds of the formula

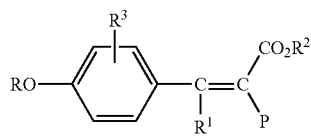

wherein:
R is hydrogen, alkyl, substituted alkyl, aryl, substituted aryl, cycloalkyl, substituted cycloalkyl or alkenyl;
$R^1$ is hydrogen, or a group such as alkyl, aryl, or cycloalkyl, all of which groups may be substituted;
$R^2$ is any radical which does not interfere with condensation with the polyester, such as hydrogen, alkyl, substituted alkyl, allyl, cycloalkyl or aryl;
$R^3$ is hydrogen or 1–3 substitutents selected from alkyl, substituted alkyl, alkoxy, substituted alkoxy and halogen, and
P is cyano, or a group such as carbamyl, aryl, alkylsulfonyl, arylsufonyl, heterocyclic, alkanoyl, or aroyl, all of which groups may be substituted.

Preferred methine compounds are those of the above formula wherein: $R^2$ is hydrogen, alkyl, aralkyl, cycloalkyl, cyanoalkyl, alkoxyalkyl, hydroxyalkyl or aryl; R is selected from hydrogen; cycloalkyl; cycloalkyl substituted with one or two of alkyl, alkoxy or halogen; phenyl; phenyl substituted with 1–3 of alkyl, alkoxy, halogen, alkanoylamino, or cyano; straight or branched lower alkenyl; straight or branched alkyl and such alkyl substituted with 1–3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsufamoyl; vinyl-sulfonyl; acrylamido; sulfamyl; benzoylsulfonicimido; alkylsulfonamido; phenylsulfonamido; alkenylcarbonylamino; groups of the formula

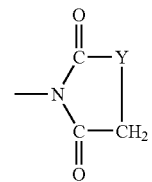

where Y is —NH—, —N-alkyl, —O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

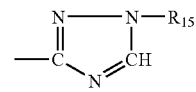

—NHXR$_{16}$, —CONR$_{15}$R$_{15}$, and —SO$_2$NR$_{15}$R$_{15}$ wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—, and R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1–3 alkyl, alkoxy, or halogen substituents; and P is cyano, carbamyl, N-alkylcarbamyl, N-alkyl-N-arylcarbamyl, N,N-dialkylcarbamyl, N,N-alkylarylcarbamyl, N-arylcarbamyl, N-cyclohexyl-carbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1–10 carbons, preferably 1–6 carbons, straight or branched chain. Preferred UV absorbing compounds include those where R and $R^1$ are hydrogen, $R^3$ is hydrogen or alkoxy, $R^2$ is alkyl or a substituted alkyl, and P is cyano. In this embodiment, a preferred class of substituted alkyl is hydroxy substituted alkyl. A most preferred polyester composition comprises from about 10 to about 700 ppm of the reaction residue of the compound

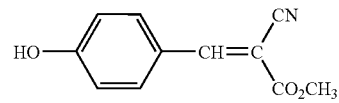

These compounds, their methods of manufacture and incorporation into polyesters are further disclosed in U.S. Pat. No. 4,617,374 the disclosure of which is incorporated herein by reference. The UV absorbing compound(s) may be present in amounts between about 1 to about 5,000 ppm by weight, preferably from about 2 ppm to about 1,500 ppm, and more preferably between about 10 and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The polyester compositions of the present invention are suitable for forming a variety of shaped articles, including films, sheets, tubes, preforms, molded articles, containers and the like. Suitable processes for forming said articles are known and include extrusion, extrusion blow molding, melt casting, injection molding, stretch blow molding (SBM), thermoforming, and the like.

The present invention is illustrated by the examples below. However, the examples should not be interpreted as a limitation on the present invention.

EXAMPLE 1

PET A is a polyethylene terephthalate polymer modified with 1.5 mole % cyclohexanedimethanol prepared from purified terephthalic acid and having an It.V. of about 0.80 dL/g, catalyzed with an antimony compound and not containing activated carbon or any other added reheat rate enhancing additive or any intentionally added reducing agent to cause the formation of antimony metal.

Samples of PET A were prepared containing activated carbon (AC), black iron oxide (BIO) and carbon black (CB) reheat additives. Five different types of AC were used, all available from NORIT Americas Inc., under the tradenames of: Darco® GFP, Darco® Gro-Safe, Darco® G-60, Darco® Insul, and Darco® S-51. Darco® GFP is a powdered activated carbon produced by steam activation of lignite coal with a $d_{50}$ particle size of 12 μm. Darco® Gro-Safe is a specialty powdered activated carbon for agricultural applications and has and a $d_{50}$ particle size of 19 μm. Darco® G-60 is a steam activated carbon produced from a proprietary raw material and has a $d_{50}$ particle size of 24 μm. Darco® Insul is a finely ground activated carbon with a high pore volume and low density with a $d_{50}$ particle size of 5 μm. Darco® S-51 is an acid washed powdered activated carbon produced by steam activation of lignite coal, having a $d_{50}$ particle size of 28 μm. BIO was purchased from Ferro Corporation having an average particle size of 3.2 μm. CB was Special Schwarz Number 4 obtained from DeGussa having an average particle size of 20 μm (trimodal distribution).

A concentrate (approximately 0.2 percent by weight) of each additive in PET A polymer composition was prepared using a Daca® MicroCompounder according to the following method. Each reheat additive was dry blended in a glass bottle with PET A that had been cryogenically ground to a particle size that was small enough to pass through a sieve with 3-mm diameter holes. The blended mixture was dried at 110° C. overnight in a vacuum oven at a pressure of less than thirty inches of water. The dry mixture was melt blended in a DACA® MicroCompounder, using a screw temperature of 290° C. and a screw speed of 120 rpm. The mixture was re-circulated in the instrument for two minutes and then extruded. The resulting extrudate was cryogenically ground in a Wiley mill to produce a powder small enough to pass a screen with 3-mm diameter holes. This final melt concentrate was then dry blended with additional PET A in a series of glass jars to produce the desired concentration of reheat additive in the final polymer set. Each of the final dried polymer sets were extruded using the DACA MicroCompounder as described above, except that the two minute recirculation time was not used. The extrudate was allowed to solidify at room temperature and was then ground to pass through a 3 mm screen in a Wiley Mill. Typically these final concentrations ranged from 5 to 100 ppm of the reheat additive in PET A. The powdered material was dried at 110° C. overnight in a vacuum oven at a pressure of less than thirty inches of water before preparation of discs, as described below.

A series of three, 3-cm diameter, 67 mil thick clear discs were prepared from each of the final mixtures described above. Disc preparation was done by extruding each mixture at a temperature of 290° C. and 120 rpm screw speed into the instrument's micro-injector barrel. The barrel was purged with material before attempting to mold any discs. The final discs were prepared using an injector pressure between 80 and 120 psi to the injection piston. The disc mold was maintained at a temperature range of 10–25° C. by circulation of chilled water.

Reheat rate measurements were made according to the following test method. The molded polymer discs were set aside for 24 hours to equilibrate to ambient temperature. Both the control discs and a set of three sample discs at each level of reheat additive were each treated as follows. The disc was placed onto a support contacting the molded item only along its edges. An actuator then moved the disc beneath a pyrometer and measured the initial temperature ($T_i$). The disc was then moved to a fixed distance below a lamp equipped with a bulb (GE DYH projection bulb, 250-W, 120-V) operating at 60V and was exposed to radiant light for 20 seconds. The color temperature of the lamp was approximately 2200° C. After heating, the disc was automatically returned to the pyrometer where the surface temperature of the center area of the side which faced the lamp (front side) was recorded two seconds after the lamp was turned off ($T_f$). A 90-second cooling cycle was used between consecutive tests, during which a fan cooled the lamp housing prior to loading the next sample. The reheat index of the sample was calculated by the following equation:

$$\text{Reheat Index} = (T_f - T_i)\text{sample}/(T_f - T_i)\text{control}$$

where the control material used in the examples was PET A without activated carbon or any other added reheat additive, tested in the exact same manner as the sample discs.

Disc color (L*, a*, b*) was measured using a HunterLab UltraScan spectrocolorimeter. Three discs were stacked together to give a sample with approximately 200-mil thickness. The instrument was operated using a D65 illuminant light source with a 10° observation angle and integrating sphere geometry. The color measurements were made in the total transmission (TTRAN) mode, in which both light transmitted directly through the sample and the light that is diffusely scattered is measured. Three chips were stacked together using a special holder in front of the light source, with the area of largest surface area placed perpendicular to the light source.

FIGS. 1 and 2 show that polymer L* was higher (i.e. brighter) for all the activated carbon samples at any given reheat index (including 1.05) than BIO or CB. Table 1 gives the polymer L* values predicted at a reheat index of 1.08, as determined by the linear equations relating reheat index and L*. It also lists the amount of each reheat additive needed to reach a 1.08 reheat index.

TABLE 1

Evaluation of AC, BIO and CB Reheat Additives in PET A

| Additive | L* at Reheat Index = 1.08 | ppm reheat agent needed for Reheat Index = 1.08 |
| --- | --- | --- |
| AC (Darco GFP) | 79.2 | 27 |
| AC (Darco Gro-Safe) | 78.9 | 36 |
| AC (Darco G-60) | 77.3 | 59 |
| AC (Darco Insul) | 77.1 | 19 |
| AC (Darco S-51) | 76.6 | 42 |
| CB | 73.2 | 7 |
| BIO | 72.7 | 37 |

EXAMPLE 2

Activated carbon, BIO and reduced antimony (RA) reheat agents were added to several PET B polymers made according to the recipe below. The same five activated carbon samples described in Example 1 were used. The BIO sample was the same as used in Example 1. The RA reheat agent was formed in-situ by the addition of phosphorous acid reducing agent to produce a calculated amount of reduced elemental antimony acting as a reheat agent in the range of about 10 to 100 ppm. PET B polymers were prepared in the following manner. A typical charge of reactant to a 5-L three-necked round bottom flask is shown in the Table 1A below.

TABLE 1A

| Reactant | Amount (grams) |
| --- | --- |
| Dimethyl terephthalate | 1941.9 |
| Ethylene glycol | 1230.23 |
| 1,4-Cyclohexanedimethanol | 25.96 |
| Manganese acetate (tetrahydrate) | 0.475 |
| Antimony trioxide | 0.580 |
| Acetyltriisopropyl titanate (ATIP) in Ethylene glycol (0.334 wt % Ti) | 11.60 |

The reaction mixture was heated and stirred and methanol was removed via a packed column. The temperature of the reaction mixture was allowed to increase until the mass of methanol removed was approximately the amount expected for 100% conversion of the DMT charged. Once the reaction was deemed to be complete, the heating source was removed and the mixture was allowed to cool to a temperature below the boiling point of EG, at which time the mixture was poured into a stainless steel pan and allowed to cool and solidify.

One hundred and twenty eight grams of the reaction product was charged to each of several 500 ml round-bottom flasks. Each flask was then fitted with a condensate take-off head that had provision for the insertion of the shaft of a stainless steel stirring apparatus. The head also included a hose connection to permit the introduction of nitrogen gas. A nitrogen purge was initiated and the flask was immersed into a molten metal bath which served as the source of heat for the reaction. The metal bath was preheated to a temperature of 225° C. prior to insertion of the reaction flask. Polymerization was accomplished according to the reaction profile shown below. The reheat agent was added as a slurry in ethylene glycol during stage 4 of the reaction sequence, and an appropriate amount of phosphorus, as phosphoric acid in ethylene glycol, was also added during stage 4. In the case of RA reheat agent, a portion of the phosphoric acid was replaced with phosphorous acid reducing agent in order to reduce a portion of the antimony catalyst to antimony metal. The reaction continued according to the set-points shown in Table 1B below. Using this procedure and catalyst system, a product intrinsic viscosity of 0.70+/−0.06 was obtained. The polymer was recovered from the flask, ground through a 3 mm screen in a Wiley Mill, and dried overnight at 110° C. in a vacuum oven at a pressure of less than thirty inches of water before preparation of discs, as described in Example 1. Reheat rate and L* color were measured on the discs, as described in Example 1.

TABLE 1B

| Stage | Time (minutes) | Temperature set-point (° C.) | Pressure (mm Hg) | Stirring rate (shaft rpm) |
| --- | --- | --- | --- | --- |
| 1 | 0.1 | 275 | ATM | 0 |
| 2 | 10 | 275 | ATM | 100 |
| 3 | 2 | 275 | 165 | 100 |
| 4 | 5 | 275 | 165 | 100 |
| 5 | 30 | 275 | 165 | 100 |
| 6 | 10 | 292 | 3.8 | 100 |
| 7 | 35 | 292 | 3.8 | 100 |
| 8 | 3 | 298 | 0.8 | 100 |
| 9 | 18 | 298 | 0.8 | 100 |
| 10 | 1 | 298 | 150 | 0 |

The plots of reheat index versus L* in FIGS. 3 and 4 show the unexpected result that all of the activated carbon samples gave brighter polymers (i.e. higher L*) than BIO and RA. Table 2 gives the polymer L* values predicted at a reheat index of 1.08, as determined by the linear equations relating reheat index and L*. It also lists the amount of each reheat additive needed to reach a 1.08 reheat index.

It was surprising to find that a PET polymer containing activated carbon is brighter in L* color compared to carbon black, black iron oxide and reduced antimony reheat aids.

TABLE 2

Evaluation of AC, BIO and RA Reheat Additives in PET B

| Additive | L* at Reheat Index = 1.08 | ppm reheat agent needed for Reheat Index = 1.08 |
| --- | --- | --- |
| AC (Darco G-60) | 79.0 | 67 |
| AC (Darco Gro-Safe) | 77.6 | 57 |
| AC (Darco Insul) | 76.4 | 21 |
| AC (Darco S-51) | 76.0 | 62 |
| AC (Darco GFP) | 75.9 | 53 |
| BIO | 74.1 | 28 |
| RA | 67.1 | n/a |

EXAMPLE 3

A concentrate containing 0.17 wt % of Darco G60 activated carbon in PET A was prepared using a Daca® Micro-Compounder. Activated carbon (0.085 g) was combined with PET A (50.01 g) which had been ground to pass through a 3 mm screen in a Wiley Mill and dried at 110° C. overnight in a vacuum oven at a pressure of 30 inches of water. The mixture was extruded at a temperature of 285° C. and a screw speed of 120 rpm. The material was re-circulated in the compounder for two minutes and then extruded. The resulting extrudate was cryogenically ground in a Wiley Mill to pass through a 3 mm screen. This concentrate was then blended into PET A which had been ground to pass through a 3 mm screen to give final concentrations of 50, 100 and 200 ppm activated carbon in PET A. These blends were dried overnight at 110° C. in a vacuum oven at a pressure of 30 inches of water. The blends were extruded using a Daca® MicroCompounder in the following manner. Approximately 3.3 g of the blend was charged to the MicroCompounder operating at 285° C. and a screw speed of 120 rpm, until the motor load was approximately 1100 Newtons. The blend was recirculated in the compounder for exactly two minutes and then it was extruded into a Dewar flask containing liquid nitrogen. This procedure was repeated two times until a total of ten grams of extruded material was obtained for each blend. The extruded blends were kept in a freezer until they were analyzed for AA concentration.

AA concentration was measured by the French National Method test method. The extruded samples were cryogenically ground through a Wiley Mill equipped with a 1.0 mesh screen. A portion of the sample (0.20 g) was then weighed into a 20-mL head-space vial, sealed and then heated at 150° C. for sixty minutes. After heating, the gas above the sealed sample of PET polymer was injected onto a capillary GC column. The acetaldehyde was separated, and the ppm of acetaldehyde present in the sample was calculated.

The data in Table 3 show that the addition of activated carbon decreased the amount of AA formed in the extruded polymer.

TABLE 3

| Activated Carbon in PET A, ppm | AA (ppm) measured by French National AA test | Percent decrease in AA level |
|---|---|---|
| 0 | 9.28 | |
| 49 | 8.28 | 10.7% |
| 100 | 8.10 | 12.7% |
| 197 | 7.05 | 24.0% |

What we claim is:

1. A polyester composition comprising a polyester polymer and activated carbon having a $d_{50}$ particle size of 3 μm or more in an amount ranging from 0.5 ppm to 250 ppm based on the weight of all polyester polymers in the polyester composition, and wherein said polyester polymer comprises a polyalkylene terephthalate polymer comprising:
   a) a diacid component comprising at least 60 mole percent terephthalic acid;
   b) a diol component comprising at least 60 mole Percent ethylene glycol; the mole percentage of all diacid components totaling 100 mole percent and the mole percentage for all diol components totaling 100 mole percent.

2. The polyester composition of claim 1, wherein the composition is in the form of a beverage bottle preform.

3. The polyester composition of claim 1, wherein said polyester composition comprises polyethylene terephthalate.

4. The polyester composition of claim 3, wherein said activated carbon is prepared by thermal decomposition of a precursor material to form a crude char, and gasification of said char by exposing the char to an oxidizing atmosphere.

5. The polyester composition of claim 3, wherein said activated carbon comprises an acid washed activated carbon powders prepared by steam activation of lignite coal.

6. The polyester composition of claim 3, wherein said polyester composition has a polyester polymer continuous phase, and said activated carbon is disposed randomly within the polyester polymer continuous phase.

7. The polyester composition of claim 1, wherein the activated carbon is selected to improve the rate at which the polyester composition reheats to a reheat rate index of at least 1.05 while maintaining the polyester composition L* brightness of 70 or more at a reheat rate index of 1.05.

8. The polyester composition of claim 1, wherein the amount of activated carbon in the polyester composition ranges from 3 ppm to 50 ppm based on the weight of the all the polyester polymers in the polyester composition.

9. The polyester composition of claim 3, wherein the $d_{50}$ particle size of the activated carbon ranges from 3 μm to 50 μm.

10. The polyester composition of claim 3, wherein the activated carbon has a particle size distribution in which at least 90% of the particles fall through a 140 standard US sieve.

11. The polyester composition of claim 3, wherein the activated carbon has a particle size distribution in which at least 90% of the particles fall through a 325 standard US sieve.

12. The polyester composition of claim 1, comprising activated carbon having a $d_{50}$ particle size ranging from 3 μm to 50 μm in an amount ranging from 3 ppm to 50 ppm and having a reheat index of 1.05 or more and an L* brightness level of 70 or more at a reheat rate index of 1.05.

13. The polyester composition of claim 1, comprising activated carbon having a $d_{50}$ particle size ranging from 3 μm to 50 μm in an amount ranging from 3 ppm to 50 ppm and having a reheat index of 1.05 or more and an L* brightness level of 80 or more at a reheat rate index of 1.05.

14. The polyester composition of claim 1, wherein the polyester polymer comprises polyethylene terephthalate and the activated carbon has a specific surface area of 500 $m^2/g$ or greater.

15. A process for the manufacture of a polyester composition comprising a polyester polymer comprising a polyalkylene terephthalate or naphthalate polymer, comprising adding activated carbon having a particle size of 3 μm or more to a melt phase for the manufacture of said polyester polymer, in an amount ranging from 0.5 ppm to 250 ppm based on the weight of all the polyester polymers in the polyester composition.

16. The process of claim 15, wherein said activated carbon is added to an esterification zone, to a prepolymer zone, to a finishing zone, to a pelletizing zone, or to any point between said zones.

17. The process of claim 16, wherein said activated carbon is added between a prepolymerization zone and a finishing zone, to a finishing zone, or to a pelletization zone.

18. A process for the manufacture of a polyester composition comprising a polyester polymer comprising a polyalkylene terephthalate polymer or a polyalkylene naphthalate polymer, comprising adding activated carbon having a $d_{50}$ particle size of 3 μm or greater in an amount ranging from 0.5 to 250 ppm based on the weight of all polyester polymers in the polyester composition:
   a) to an esterification zone, a prepolymerization zone, or at any point in between said two zones, simultaneous with a phosphorus containing compound, or
   b) to an esterification zone before a phosphorus containing compound is added to the esterification zone, wherein the phosphorus containing compound is added prior to completing the esterification reaction to the desired degree of esterification, or c) after the addition of the phosphorus compound to a reaction mixture in an esterification zone or a prepolymerization zone provided that the reaction mixture contains an active phosphorus containing compound.

19. The process of claim 18, wherein the phosphorus containing compound comprises acidic phosphorus-containing compounds comprising phosphoric acid, phosphorous acid, polyphosphoric acid, carboxyphosphonic acids, acidic phosphate esters, trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each.

20. A process for the manufacture of a polyester composition comprising a polyester polymer comprising a polyalkylene terephthalate polymer or a polyalkylene naphthalate polymer, comprising adding activated carbon having a $d_{50}$ particle size of 3 µm or greater in an amount ranging from 0.5 ppm to 250 ppm based on the weight of all the polyester polymers in the polyester composition, to:
   a) the melt phase for the production of said polyester polymer after the prepolymer zone, or
   b) to precursor or solid stated polyester solids by melt blending, or
   c) or to an injection molding machine for the manufacture of bottle preforms.

21. The process of claim 20, comprising adding activated carbon to an injection molding machine for the manufacture of bottle preforms.

22. The process of claim 20, wherein said polyester composition comprises polyethylene terephthalate polymers.

23. The process of claim 21, comprising adding from 3 ppm to 50 ppm activated carbon to the based on the weight of the all the polyester polymers in the polyester composition.

24. The process of claim 21, wherein the $d_{50}$ particle size of the activated carbon ranges from 3 µm to 50 µm.

25. A process for making a polyester bottle preform, comprising feeding a molten or solid bulk polyester and a liquid, molten or solid polyester concentrate composition to a machine for manufacturing the preform, said concentrate composition comprising activated carbon having a $d_{50}$ particle size of 3 µm or more and a polyester polymer in an amount of at least 65 wt. % based on the weight of the concentrate composition, to obtain a polyester bottle preform having activated carbon in an amount ranging from 0.5 µm to 250 ppm, based on the weight of all polyester polymers in the bottle preform.

26. The process of claim 25, wherein the activated carbon is present in the concentrate in an amount of at least 0.15 wt. %.

27. The process of claim 25, wherein the concentrate polyester polymer is the same polyester as the bulk polyester polymer.

28. The process of claim 25, wherein the bulk polyester and the polyester concentrate are fed to the machine in separate streams.

29. The process of claim 25, wherein the concentrate polyester comprises post consumer recycle polyester.

30. A process for the manufacture of a polyester composition, comprising adding a concentrate polyester composition to a melt phase process for the manufacture of virgin polyester polymers, said concentrate comprising activated carbon having a $d_{50}$ particle size of 3 µm or more and at least 65 wt. % of a polyester polymer, to obtain a polyester composition having activated carbon in an amount ranging from 0.5 ppm to 250 ppm based on the weight of all polyester polymers in the polyester composition.

31. The process of claim 30, wherein the polyester concentrate composition has an It.V., and the concentrate is added to a stage in the melt phase having an It.V.—which is similar to the It.V. of the melt phase composition.

32. The process of claim 31, wherein the It.V. of the concentrate added has an It.V. within +/−0.2 It.V. units of the It.V of the melt phase composition.

33. A polyester composition comprising activated carbon having a $d_{50}$ particle size of 3 µm or more in an amount ranging from 0.5 ppm to 250 ppm based on the weight of all polyester polymers in the polyester composition, and having an acetaldehyde level reduced by at least 5% relative to acetaldehyde level in the same composition without said activated carbon.

34. The polyester composition of claim 33, wherein the acetaldehyde level is reduced by at least 10% relative to acetaldehyde level in the same composition without said activated carbon.

35. The process of claim 21, comprising adding activated carbon to the melt phase process for the production of the polyester polymer with a finishing zone.

36. The process of claim 20, comprising adding activated carbon to the melt phase for the production of the polyester polymer within a pelletization zone.

37. The process of claim 36, wherein activated carbon is added to an extruder within the pelletization zone.

38. A polyester composition comprising a polyester polymer and activated carbon having a $d_{50}$ particle size of 3 µm or more in an amount ranging from 0.5 ppm to 250 ppm based on the weight of all the polyester polymers in the polyester composition.

39. The polyester composition of claim 38, wherein the composition is in the form of a bottle preform.

40. The polyester composition of claim 39, wherein the composition is in the form of a bottle.

41. The polyester composition of claim 38, wherein said polyester composition comprises polyethylene terephthalate.

42. The polyester composition of claim 41, wherein said activated carbon is prepared by thermal decomposition of a precursor material to form a crude char, and gasification of said char by exposing the char to an oxidizing atmosphere.

43. The polyester composition of claim 41, wherein said activated carbon comprises an acid washed activated carbon powders prepared by steam activation of lignite coal.

44. The polyester composition of claim 41, wherein said polyester composition has a polyester polymer continuous phase, and said activated carbon is disposed randomly within the polyester polymer continuous phase.

45. The polyester composition of claim 38, wherein the amount of activated carbon is selected to improve the rate at which the polyester composition reheats to a reheat rate index of at least 1.05 while maintaining the polyester composition L* brightness of 70 or more at a reheat rate index of 1.05.

46. The polyester composition of claim 38, wherein the amount of activated carbon in the polyester composition ranges from 3 ppm to 50 ppm based on the weight of the all the polyester polymers in the polyester composition.

47. The polyester composition of claim 41, wherein the $d_{50}$ particle size of the activated carbon ranges from 3 µm to 50 µm.

48. The polyester composition of claim 41, wherein the activated carbon has a particle size distribution in which at least 90% of the particles fall through a 140 standard US sieve.

49. The polyester composition of claim 41, wherein the activated carbon has a particle size distribution in which at least 90% of the particles fall through a 325 standard US sieve.

50. The polyester composition of claim 38, comprising activated carbon having a $d_{50}$ particle size ranging from 3 µm to 50 µm in an amount ranging from 3 ppm to 50 ppm and having a reheat index of 1.05 or more and an L* brightness level of 70 or more at a reheat rate index of 1.05.

51. The polyester composition of claim 38, comprising activated carbon having a $d_{50}$ particle size ranging from 3 µm to 50 µm in an amount ranging from 3 ppm to 50 ppm and having a reheat index of 1.05 or more and an L* brightness level of 80 or more at a reheat rate index of 1.05.

52. A beverage bottle comprising a polyester composition comprising a polyester polymer and activated carbon having a $d_{50}$ particle size of 3 µm or more.

53. The beverage bottle of claim 52, wherein the composition is in the form of a bottle preform.

54. The beverage bottle of claim 53, wherein the composition is in the form of a stretch blow molded bottle.

55. The beverage bottle of claim 52, wherein said polyester composition comprises polyethylene terephthalate.

56. The beverage bottle of claim 55, wherein said activated carbon is prepared by thermal decomposition of a precursor material to form a crude char, and gasification of said char by exposing the char to an oxidizing atmosphere.

57. The beverage bottle of claim 55, wherein said activated carbon comprises an acid washed activated carbon powders prepared by steam activation of lignite coal.

58. The beverage bottle of claim 55, wherein said polyester composition has a polyester polymer continuous phase, and said activated carbon is disposed randomly within the polyester polymer continuous phase.

59. The beverage bottle of claim 52, wherein the activated carbon is selected to improve the rate at which the polyester composition reheats to a reheat rate index of at least 1.05 while maintaining the polyester composition L* brightness of 70 or more at a reheat rate index of 1.05.

60. The beverage bottle of claim 52, wherein the amount of activated carbon in the polyester composition ranges from 3 ppm to 50 ppm based on the weight of the all the polyester polymers in the polyester composition.

61. The beverage bottle of claim 55, wherein the $d_{50}$ particle size of the activated carbon ranges from 3 µm to 50 µm.

62. The beverage bottle of claim 55, wherein the activated carbon has a particle size distribution in which at least 90% of the particles fall through a 140 standard US sieve.

63. The beverage bottle of claim 55, wherein the activated carbon has a particle size distribution in which at least 90% of the particles fall through a 325 standard US sieve.

64. The beverage bottle of claim 52, comprising activated carbon having a $d_{50}$ particle size ranging from 3 µm to 50 µm in an amount ranging from 3 ppm to 50 ppm and having a reheat index of 1.05 or more and an L* brightness level of 70 or more at a reheat rate index of 1.05.

65. The beverage bottle of claim 52, comprising activated carbon having a $d_{50}$ particle size ranging from 3 µm to 50 µm in an amount ranging from 3 ppm to 50 ppm and having a reheat index of 1.05 or more and an L* brightness level of 80 or more at a reheat rate index of 1.05.

66. The beverage bottle of claim 52, wherein the polyester polymer comprises polyethylene terephthalate and the activated carbon has a specific surface area of 500 $m^2/g$ or greater.

67. A process for the manufacture of a polyester composition comprising a polyester polymer comprising a polyalkylene terephthalate or naphthalate polymer, comprising adding activated carbon having a particle size of 3 µm or more in an amount of 0.5 ppm to 250 ppm, based on the weight of the polyester polymer, to a melt phase for the manufacture of said polyester polymer, to said polyester polymer in the form of solid-stated pellets, or to an injection molding machine for the manufacture of preforms from said polyester polymer.

68. The process of claim 67, wherein said activated carbon is added to an esterification zone, to a prepolymer zone, to a finishing zone, to a pelletizing zone, or to any point between said zones.

69. The process of claim 68, wherein said activated carbon is fed to an injection molding machine in a stream separate from a stream of polyethylene terephthalate fed to said machine.

70. The process of claim 67, comprising adding activated carbon in an amount ranging from 3 to 100 ppm, based on the weight of said polyester polymer.

71. The process of claim 67, comprising adding activated carbon in an amount ranging from 3 to 50 ppm, based on the weight of said polyester polymer.

72. A process for the manufacture of polyester composition comprising adding activated carbon to a melt phase for the manufacture of polyester polymer in the presence of an active phosphorus containing compound, wherein the amount of activated carbon added to the melt phase is within a range of 0.5 ppm to 250 ppm, based on the weight of the polyester polymer.

73. The process of claim 72, wherein the phosphorus containing compound comprises acidic phosphorus-containing compounds comprising phosphoric acid, phosphorous acid, polyphosphoric acid, carboxyphosphonic acids, acidic phosphate esters, trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each, and the polyester polymer comprises polyethylene terephthalate.

74. The process of claim 73, wherein the activated carbon has a $d_{50}$ particle size of about 3 µm or greater.

75. A process for the manufacture of polyester polymer bottle preform, comprising adding a polyester polymer composition comprising a polyester polymer and activated carbon to a machine for manufacturing the preform, wherein said polyester polymer composition comprises a polyester polymer and activated carbon having a $d_{50}$ particle size of 3 µm or more in an amount ranging from 0.5 ppm to 250 ppm based on the weight of all polyester polymers in the polyester composition.

76. The process of claim 75, wherein said process produces a bottle preform, and said bottle preform is stretch blow molded into a bottle.

77. The process of claim 76, wherein said polyester polymer contains repeating terephthalate or napthalate units.

78. The process of claim 75, wherein the composition is in the form of a bottle preform.

79. The process of claim 78, wherein the composition is in the form of a bottle.

80. The process of claim 75, wherein said polyester composition comprises polyethylene terephthalate.

81. The process of claim 80, wherein said activated carbon is prepared by thermal decomposition of a precursor material to form a crude char, and gasification of said char by exposing the char to an oxidizing atmosphere.

82. The process of claim 80, wherein said activated carbon comprises an acid washed activated carbon powders prepared by steam activation of lignite coal.

83. The process of claim 80, wherein said polyester composition has a polyester polymer continuous phase, and said activated carbon is disposed randomly within the polyester polymer continuous phase.

84. The process of claim 75, wherein the activated carbon is selected to improve the rate at which the polyester composition reheats to a reheat rate index of at least 1.05 while maintaining the polyester composition L* brightness of 70 or more at a reheat rate index of 1.05.

85. The process of claim 75, wherein the amount of activated carbon in the polyester composition ranges from 3 ppm to 50 ppm based on the weight of the all the polyester polymers in the polyester composition.

86. The process of claim 80, wherein the $d_{50}$ particle size of the activated carbon ranges from 3 μm to 50 μm.

87. The process of claim 80, wherein the activated carbon has a particle size distribution in which at least 90% of the particles fall through a 140 standard US sieve.

88. The process of claim 80, wherein the activated carbon has a particle size distribution in which at least 90% of the particles fall through a 325 standard US sieve.

89. The process of claim 75, comprising activated carbon having a $d_{50}$ particle size ranging from 3 μm to 50 μm in an amount ranging from 3 ppm to 50 ppm and having a reheat index of 1.05 or more and an L* brightness level of 70 or more at a reheat rate index of 1.05.

90. The process of claim 75, comprising activated carbon having a $d_{50}$ particle size ranging from 3 μm to 50 μm in an amount ranging from 3 ppm to 50 ppm and having a reheat index of 1.05 or more and an L* brightness level of 80 or more at a reheat rate index of 1.05.

91. The process of claim 75, wherein the polyester polymer comprises polyethylene terephthalate and the activated carbon has a specific surface area of 500 $m^2/g$ or greater.

* * * * *